(12) United States Patent
Jobling et al.

(10) Patent No.: US 8,108,796 B2
(45) Date of Patent: Jan. 31, 2012

(54) METHOD AND SYSTEM FOR OPERATING A DEVICE

(75) Inventors: Jeremy T. Jobling, Deerfield, IL (US); Hyang S. Kim, Lakemoor, IL (US); Douglas J. Walston, Deer Park, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 544 days.

(21) Appl. No.: 11/350,739

(22) Filed: Feb. 10, 2006

(65) Prior Publication Data
US 2007/0192740 A1 Aug. 16, 2007

(51) Int. Cl.
*G06F 3/048* (2006.01)
(52) U.S. Cl. ........ 715/816; 715/810; 715/827; 455/403; 707/705
(58) Field of Classification Search .................. 715/827, 715/810, 816; 707/705; 455/403
See application file for complete search history.

(56) References Cited

U.S. PATENT DOCUMENTS

| | | | | |
|---|---|---|---|---|
| 5,748,512 A * | 5/1998 | Vargas | ........................ | 708/142 |
| 5,818,437 A * | 10/1998 | Grover et al. | ................. | 715/811 |
| 5,953,541 A * | 9/1999 | King et al. | ........................ | 710/67 |
| 6,046,732 A * | 4/2000 | Nishimoto | ..................... | 345/168 |
| 6,049,796 A * | 4/2000 | Siitonen et al. | ................... | 707/3 |
| 6,204,848 B1 * | 3/2001 | Nowlan et al. | ................ | 715/810 |
| 6,223,059 B1 * | 4/2001 | Haestrup | ....................... | 455/566 |
| 6,307,548 B1 * | 10/2001 | Flinchem et al. | ............. | 715/811 |
| 6,366,302 B1 * | 4/2002 | Crosby et al. | ................. | 715/786 |
| 6,542,170 B1 * | 4/2003 | Williams et al. | .............. | 715/816 |
| 6,564,254 B1 * | 5/2003 | Shoji et al. | ..................... | 709/217 |
| 6,694,200 B1 * | 2/2004 | Naim | .............................. | 700/94 |
| 6,738,766 B2 * | 5/2004 | Peng | ...................................... | 1/1 |
| 6,744,422 B1 * | 6/2004 | Schillings et al. | ............. | 345/169 |
| 6,744,451 B1 * | 6/2004 | Anderson et al. | ............. | 715/841 |
| 6,801,190 B1 * | 10/2004 | Robinson et al. | ............. | 345/173 |
| 6,847,959 B1 * | 1/2005 | Arrouye et al. | .................... | 707/2 |
| 6,950,988 B1 * | 9/2005 | Hawkins et al. | .............. | 715/700 |
| 7,007,239 B1 * | 2/2006 | Hawkins et al. | .............. | 715/780 |
| 7,017,123 B2 * | 3/2006 | Chickles et al. | ............... | 715/816 |
| 7,072,461 B2 * | 7/2006 | Padawer et al. | .......... | 379/355.09 |
| 7,194,508 B2 * | 3/2007 | Herceg et al. | .................. | 709/203 |
| 7,340,686 B2 * | 3/2008 | Matthews et al. | ............. | 715/779 |
| 7,596,568 B1 * | 9/2009 | McConnell | .................... | 707/100 |
| 2002/0021311 A1 * | 2/2002 | Shechter et al. | .............. | 345/864 |
| 2002/0109725 A1 * | 8/2002 | Suzuki et al. | .................. | 345/769 |
| 2002/0184003 A1 * | 12/2002 | Hakkinen et al. | ................. | 704/8 |
| 2002/0187815 A1 * | 12/2002 | Deeds et al. | ................... | 455/564 |
| 2002/0196163 A1 * | 12/2002 | Bradford et al. | ................. | 341/22 |
| 2003/0095102 A1 * | 5/2003 | Kraft et al. | ..................... | 345/168 |
| 2003/0104839 A1 * | 6/2003 | Kraft et al. | ..................... | 455/566 |
| 2003/0110492 A1 * | 6/2003 | Thurston et al. | ................ | 725/39 |
| 2004/0013246 A1 * | 1/2004 | Back et al. | .................. | 379/88.17 |
| 2004/0030490 A1 * | 2/2004 | Hegedus et al. | .............. | 701/200 |
| 2004/0031017 A1 * | 2/2004 | Vaidyanathan et al. | ....... | 717/110 |
| 2004/0153975 A1 * | 8/2004 | Williams et al. | .............. | 715/531 |
| 2005/0017954 A1 * | 1/2005 | Kay et al. | ....................... | 345/169 |
| 2005/0188331 A1 * | 8/2005 | Shimada et al. | .............. | 715/816 |
| 2005/0289133 A1 * | 12/2005 | Arrouye et al. | .................... | 707/4 |
| 2005/0289479 A1 * | 12/2005 | Yoshida et al. | ............... | 715/816 |
| 2006/0013487 A1 * | 1/2006 | Longe et al. | .................. | 382/229 |
| 2006/0163337 A1 * | 7/2006 | Unruh | ........................ | 235/145 A |
| 2007/0027848 A1 * | 2/2007 | Howard et al. | .................... | 707/3 |
| 2007/0032267 A1 * | 2/2007 | Haitani et al. | .............. | 455/556.2 |

* cited by examiner

*Primary Examiner* — Tadeese Hailu
*Assistant Examiner* — Patrick Riegler

(57) ABSTRACT

An embodiment generally relates to a method of operating a device. The method includes receiving at least one character of a sequence for a default application on a user interface of a device and determining at least one other task supported by the device based on the at least one character sequence. The method also includes displaying the at least one other task on a display of the device along with the at least one character sequence for the default application.

18 Claims, 4 Drawing Sheets

METHOD AND SYSTEM FOR OPERATING A DEVICE

FIELD

This invention relates generally to operating a device. More particularly, embodiments relate to operating an electronic device that displays a list of tasks based on character input to a default application executing on the device.

DESCRIPTION OF THE RELATED ART

It is generally known that cellular telephones are useful devices. As the popularity of cellular telephones has increased, the functionality of the cellular (or wireless) telephones has also increased. For example, the wireless telephone originally allowed users to place telephone calls. Today, the wireless telephone may include a text messaging application, an image viewer, an image capture application, game application, a phone book application, a media player, etc.

As the number of applications increases on the wireless telephone, the number of inputs may increase to access these applications. For example, a user may have to enter the main menu area of the wireless telephone to access a text messaging program for writing a new text message. From the main menu, the user may then scroll through the main menu to the text messaging application. Subsequently, the user may scroll through a sub-menu of text messaging functions to select the function for creating a new text message. Similarly, the user may have to execute many Bell pad keystrokes to access many of the other applications stored on the wireless telephone.

SUMMARY

An embodiment generally relates to a method of operating a device. The method includes receiving at least one character of a sequence for a default application on a user interface of a device and determining at least one other task supported by the device based on the at least one character sequence. The method also includes displaying the at least one other task on a display of the device along with the at least one character sequence for the default application.

Another embodiment generally pertains to a computer readable storage medium on which is embedded one or more computer programs. The one or more computer programs implement a method of operating a device. The one or more computer programs includes a set of instructions for inputting at least one character into a user interface of a device for a default application and determining at least one task supported by the device based on the at least one character. The set of instructions further include displaying the at least one other task on a display of the device with at least one character sequence for the default application.

Yet another embodiment generally relates to a system for operating an electronic device. The system includes a user interface configured to receive character input for the electronic device and a task predictor module configured to interface with the user interface. The system also includes a memory configured to store files and applications, where the memory configured to interface with the task predictor module. The task predictor is configured to monitor the user interface for character input into a default application and to determine at least one task that is relevant to the character input based on previous accesses to the memory for display.

Accordingly, embodiments generally assist users in their operation of their electronic devices. More particularly, an embodiment generally relates to as a user enters a characters into a user interface for a default application executing on an electronic device, e.g., a cellular telephone, an application prediction engine may display a list of files and/or applications that may be related to the sequence of characters being entered. Thus, a user may be presented a list of files and/or applications that may be related to an entered character sequence and access a file and/or application without entering a menu structure, and thereby increasing the efficiency of the device.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
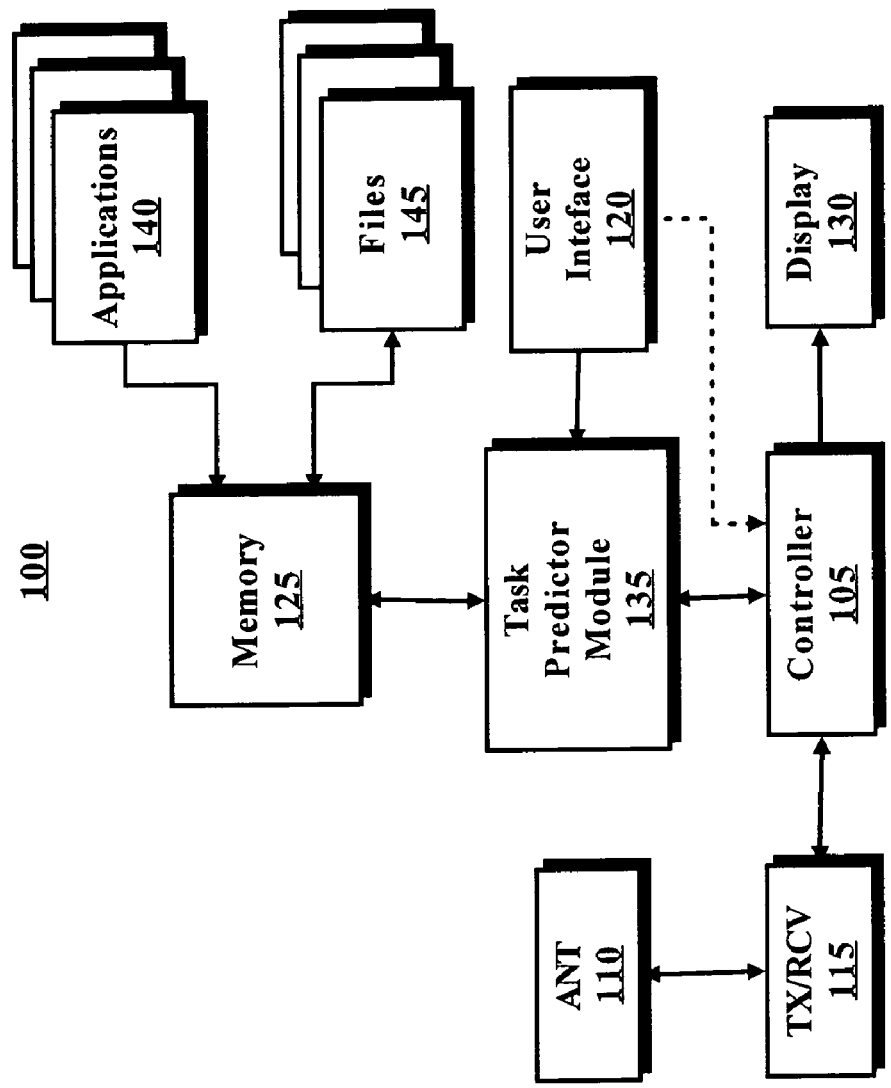
FIG. 1 illustrates a block diagram of an exemplary electronic device where an embodiment may be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of electronic devices that execute multiple applications, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to a system and method of operating a multi-purpose electronic device, e.g., a cellular telephone. The electronic device may execute multiple applications such as an image viewer, word processor, text messaging, cellular telephone, media player, etc. For example, if the electronic device is a cellular telephone, the default application may be a dialing application.

A task predictor module may be configured to provide a dynamic list of tasks while the user inputs key events into the default application, e.g., a calling application. More particularly, for each key event into the default application, the task predictor module may be configured to generate a list of tasks that may be related to the inputted character(s). The list of tasks (or categories) may be a text messaging application, a media player application, or other supported applications on the electronic device. Associated with each task may be relevant file (an audio file, a text messaging file, a video file, etc.). For example, the category may be an image viewer and the associated JPEG file. The associated JPEG file may be determined based on the current character sequence.

As the user continues with the key event input, the list of tasks may be modified, i.e., listed tasks removed or new tasks added, hence the dynamic nature of the task list. Similarly, the associated files may be added and/or existing files may be removed. The task predictor may generate its list of categories and associated files based on recently used applications, file data stored on the electronic device, meta-data, and other miscellaneous data stored on the electronic device.

The user may select a displayed task to invoke the application associated with the selected task. The controller of the device may invoke the application with the inputted character sequence. For example, if a text messaging application is invoked, the text messaging application is invoked with the current state of the character sequence (e.g., "Examiner X").

Alternatively, the user may also continue to input key events into the user interface of the electronic device to continue using the default application. Accordingly, embodiments may reduce the input activity of a user by presenting a list of tasks and associated files based on the input of the user, thus providing shortcuts to the user.

Although some embodiments use a keyboard to input characters into the electronic device, other embodiments may use a touch screen, voice recognition, gesture recognition or combination of thereof to input characters into the electronic device.

FIG. 1 illustrates a block diagram of an exemplary electronic device 100 where an embodiment may be practiced. It should be readily apparent to those of ordinary skill in the art that the device 100 depicted in FIG. 1 represents a generalized schematic illustration and that other components may be added or existing components may be removed or modified. Moreover, the device 100 may be implemented using software components, hardware components, or combinations thereof.

As shown in FIG. 1, the device 100 includes a controller 105, an antenna 110 (labeled as "ANT"), a transceiver 115 (labeled as "TX/RCV"), a user interface module 120, a memory 125, a display module 130, and a task predictor module 135.

Although FIG. 1 depicts the device 100 as a specific device, it should be readily apparent to those of ordinary skill in the art that the device 100 may be any device that can communicate with other devices using wireless communication such as radio frequency, infrared, wireless signals over a network or other similar techniques. In certain embodiments, the device 100 may be implemented a mobile telephone, a personal digital assistant ("PDA"), laptop computers and other similar portable computing devices.

Returning to FIG. 1, the controller 105 may be configured to provide the functionality of the device 100. More particularly, the controller 105 may execute an operating system and/or software programs that provide the functionality for the device 100. The controller 105 may be implemented using a microprocessor, a digital signal processor, application specific integrated circuit or other similar computing platform.

The controller 105 may also be configured to interface with the transceiver 115. The transceiver 115 may be configured to convert data (e.g., voice, video, audio, etc) between a wireless protocol and the native format of the controller 105. The wireless protocol may be implemented using Wireless Personal Area Networks (e.g., Bluetooth, HomeRF, IEEE 802.15.3 protocols or other similar protocols), Wireless Local Area Networks (e.g., Hiperlan 2, IEEE 802.11x, or other similar protocols), WiFi, Cellular Digital Packet Data, Mobitex, Wireless Application Protocol, Global System for Mobiles, or other similar wireless protocol for communicating audio, voice, data and/or video.

The transceiver 115 may be configured to interface with the antenna 110. The antenna 110 may be configured to provide a communication channel between the device 100 and a service provider. The service provider may be a cellular telephone provider, a WIFI hotspot, an ad hoc network or other similar network.

The controller 105 may be further configured to interface with the user interface 120 through the task predictor module 135. Alternatively, the controller 105 may directly interface with the user interface 120 and then interface with the task predictor module 135.

The user interface 120 may be configured to provide a mechanism for a user of the device 100 to interact therewith. In some embodiments, the user interface 120 may be a Bell keypad or a QWERTY keyboard. In other embodiments, the user interface 120 may be integrated with the display 130. More particularly, the display 130 may be a touch screen where the controller 105 executes software that permits a user to interact with the device 100 using a stylus or other similar device. In other embodiments, the user interface 120 may use voice or gesture recognition to convert oral or physical commands into characters.

The controller 105 may be further configured to interface the memory 125 through the task predictor module 135. The memory 125 may be configured to store an operating system, application software programs such as applications 140 and data entered by the user. The memory 125 may be implemented using persistent memory (e.g., flash memory, EEPROM, etc), non-persistent memory (e.g., RAM) or combinations thereof.

The applications 140 stored in memory 125 may include an internet browser, an image viewer, a media player (e.g., audio, video, or a combination thereof), a text messaging application, word processing application or other similar applications. The data stored in the memory 125 may include files 145 such as audio files, video files, and/or image files. The memory 125 may also store contact information data, game data, and other similar types of data.

The display 130 may be configured to interface with the controller 105. The display 130 may also be configured to provide a visual interface for the operation of the device 100. The display 130 may be implemented using a liquid crystal display matrix or a thin film transistor array.

The controller 105 may be configured to interface with the task predictor module 135. The task predictor module 135 may be configured to provide prediction/disambiguation for application and/or files stored on the device 100 for a character sequence entered at the user interface 120. More particularly, the task predictor module 135 may be configured to monitor and/or receive inputs from a messaging language module, the meta-data file index, the most recent messaged called or universal resource locator ("URL"), and other miscellaneous data stored on the device and/or network. A more detailed view of the task predictor module 135 is depicted in FIG. 2.

Figure 2:
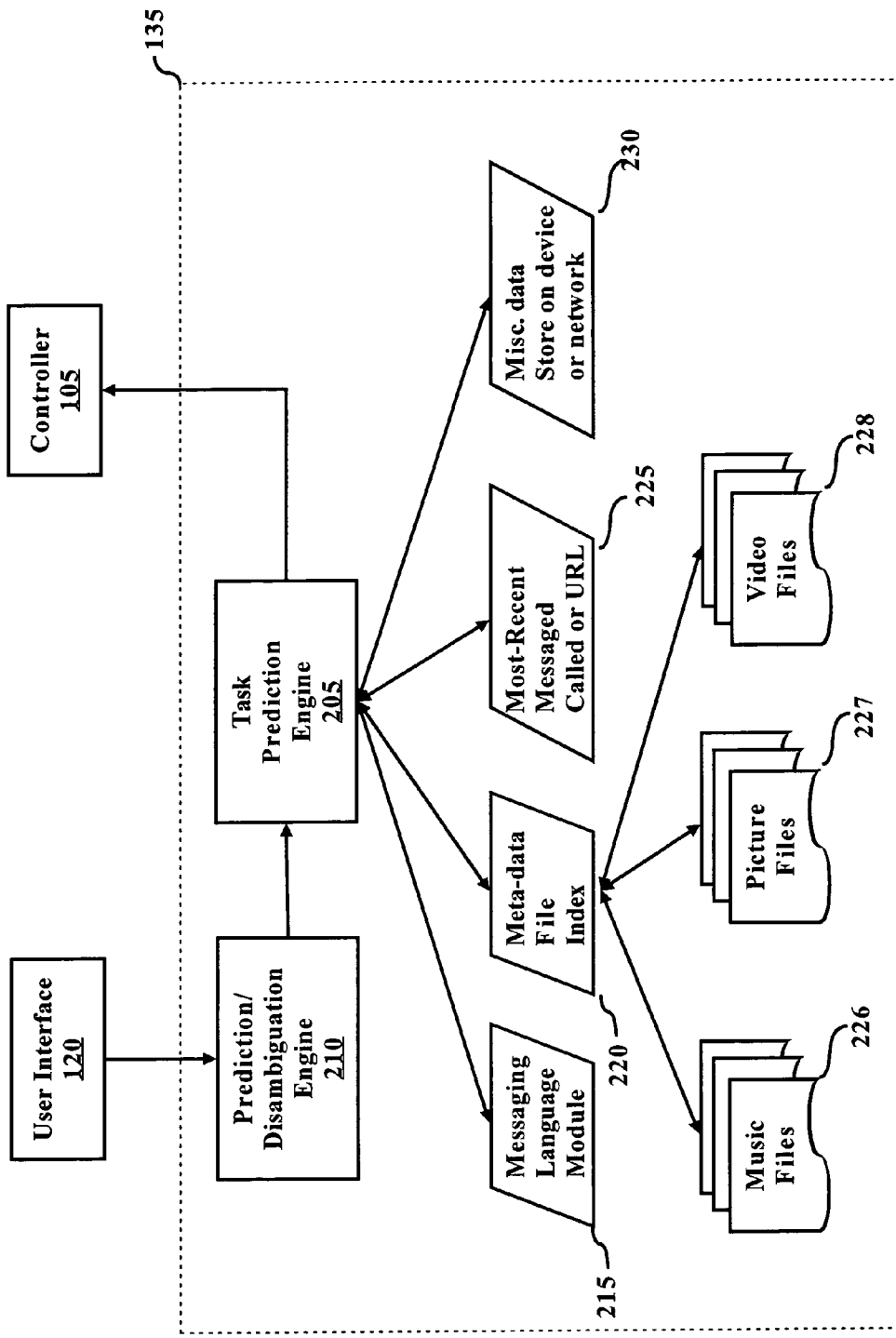
FIG. 2 illustrates a block diagram of an exemplary application prediction engine.

FIG. 2 illustrates a block diagram of an exemplary task predictor module 135 in accordance with another embodiment. It should be readily apparent to those of ordinary skill in the art that the task predictor module 135 depicted in FIG. 2 represents a generalized schematic illustration and that other components may be added or existing components may be removed or modified. Moreover, the task predictor module 135 may be implemented using software components, hardware components, or combinations thereof.

As shown in FIG. 2, the task predictor module 135 includes a task prediction engine 205 and a prediction/disambiguation engine 210. The task prediction engine 205 may be configured to generate a list of tasks based on input from the prediction/disambiguation engine 210 and activity (application usage, file access, etc.) on the device 100. More particularly, as key events are received from the user interface 120, the prediction/disambiguation engine 210 may be configured to generate a list of possible matches, which is then forwarded to the task prediction engine 205.

The task prediction engine 205 may be configured to interface with a messaging language module 215, a meta-data file index 220, a most recent used database 225, and miscellaneous data 230. The messaging language module 215 may be configured to create and store user specific words and re-sorts alternates based on the usage. The messaging language module 215 may be implemented using the messaging language module contained in iTAP™.

Another input to the task prediction engine 205 may be the meta-file data index 220. The meta-file data index 220 may include information associated with the file. The files may include audio files 226, image files 227, and/or video files 228. For example, if the file is an audio file, the meta-data may include artist, album title, length of time, song title, etc. As another example, meta-data for a video file may include artist, length of time, title, etc. The meta-data index file 220 may also include information regarding the activity of each file. The meta-data index file 220 may be used as factors for predicting the tasks and associated files by the task prediction engine 205.

Another input to the task prediction engine 205 may be the most recently used database 225, which may be configured to provide information related to text messaging application, telephone dialing application, and internet browser. More particularly, the task prediction engine 205 may factor the activity associated with using these application in its prediction of tasks and associated files based on the input character sequence.

Yet another input to the task prediction engine 205 may be the miscellaneous database 230, which is configured to store information for data stored on the device 100 or on the associated service network of the device 100. More particularly, the miscellaneous database 230 may include data related to a phonebook application, contact information, notes, etc. The data contained in the miscellaneous database 230 may be used as a factor in the prediction of tasks and associated files by the task prediction engine 205.

Accordingly, the task prediction engine 205 may be configured to process the list of possible matches with the recent activity on the device 100 to generate a list of tasks associated with the current state of key events. The activity may be text messages sent and/or received, files accessed (music, picture, and/or video), Internet accesses, contact list accesses, etc.

The prediction/disambiguation engine 210 may be implemented using a combination of text prediction and disambiguation engines such as Motorola iTAP™, T9 and/or eZiText.

Figure 3:
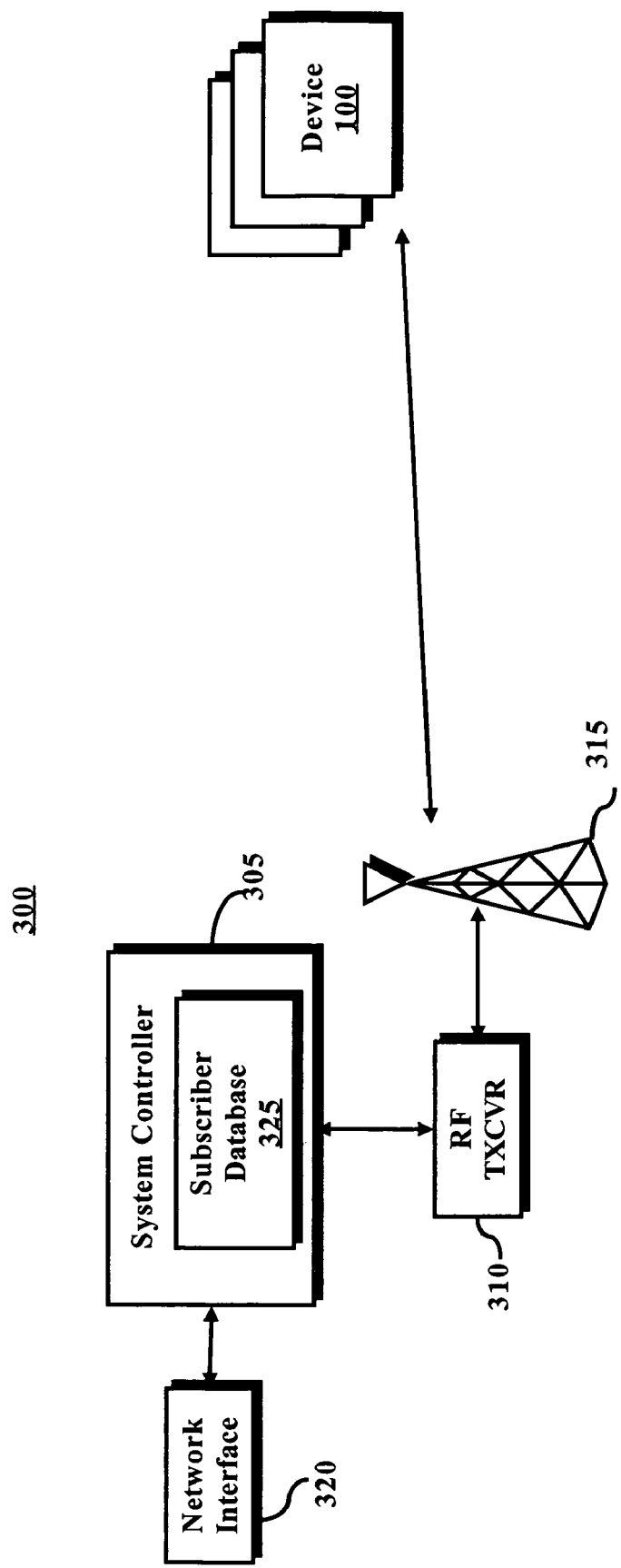
FIG. 3 illustrates a block diagram of an exemplary system where an embodiment may be practiced.

FIG. 3 illustrates a block diagram of an exemplary system 300 in accordance with yet another embodiment. It should be readily apparent to those of ordinary skill in the art that the system 300 depicted in FIG. 3 represents a generalized schematic illustration and that other components may be added or existing components may be removed or modified. Moreover, the system 300 may be implemented using software components, hardware components, or combinations thereof.

As shown in FIG. 3, the system 300 includes a system controller 305, a RF transceiver 310 ("labeled RF TRCVR"), antennas 315, and a network interface 320. The system controller 305 may be configured to interface with the RF transceiver 310 to communicate with the communication devices 100. The system controller 305 may function utilizing any wireless RF channel, for example, a one- or two-way pager channel, a mobile cellular channel, or a mobile radio channel.

The system controller 305 may include a subscriber database 325. The subscriber database 325 may be configured to provide information related to the device 100 as the device 100 enters the cell site of the antenna 315. The system controller 305 may also be configured to interface with a network interface 320. The network interface 320 may be configured to provide a communication channel to a network (not shown). The network may be a public switch telephone network, a wide area network (such as the Internet) or a combination thereof.

Figure 4:
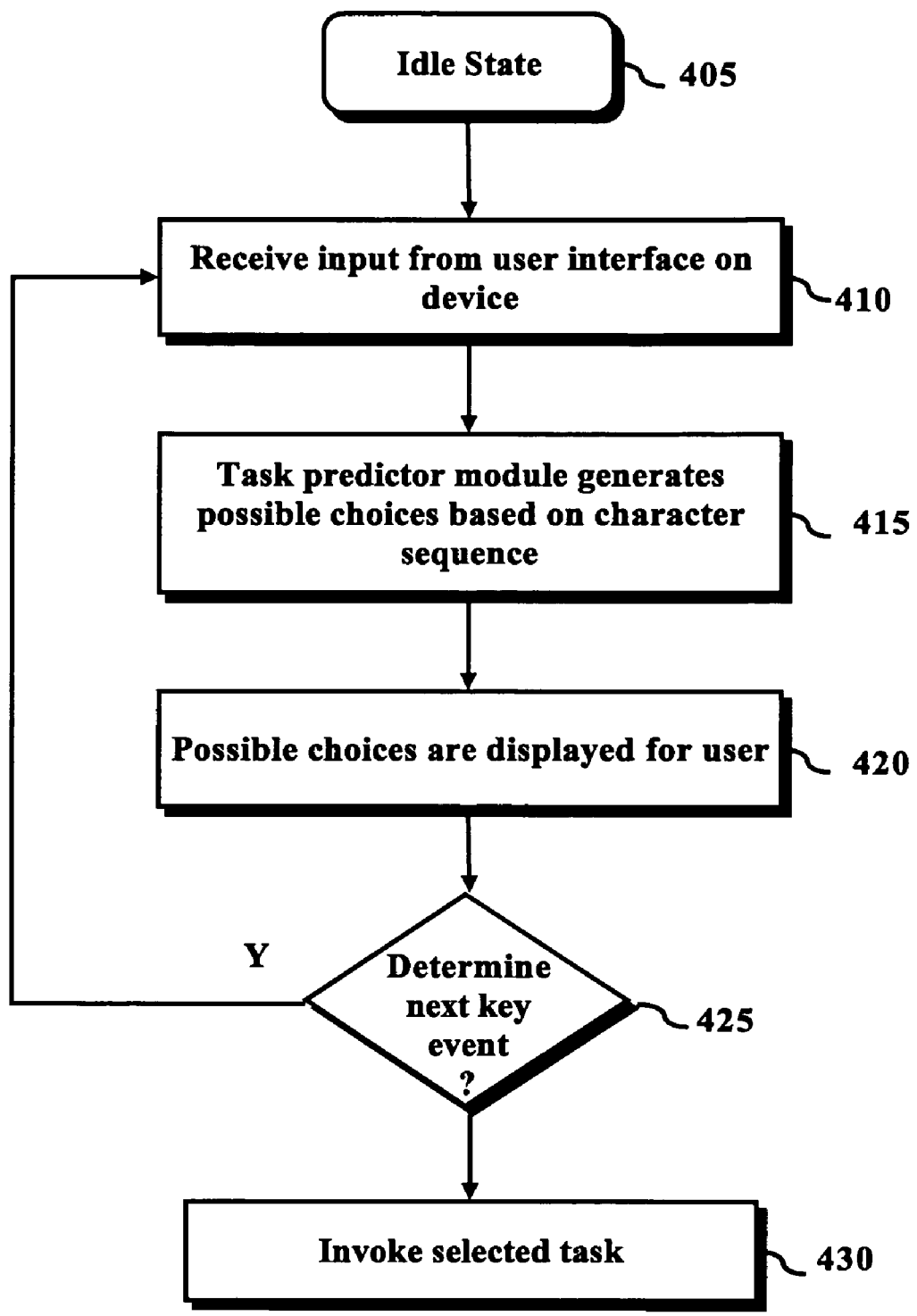
FIG. 4 illustrates a flow diagram implemented by another embodiment.

FIG. 4 illustrates a flow diagram 400 implemented by yet another embodiment. It should be readily apparent to those of ordinary skill in the art that the flow diagram 400 depicted in FIG. 4 represents a generalized schematic illustration and that other steps may be added or existing steps may be removed or modified.

As shown in FIG. 4, in step 405, the device 100 may in an idle state. More particularly, the controller 105 of the device 100 may remain in an idle state until the user begins entering a data into the user interface 120 of the device 100, i.e., a key event. The controller 105 may be configured to switch to a power-saving mode after a predetermined period of non-activity.

In step 410, a user has entered a key event from the user interface 120 and this character is processed by the task predictor module 135. The user may have started entering key events into the default application executed by the controller 105, e.g., a calling application.

In step 415, the task predictor module 135 may generate a list of possible tasks that the task predictor module 135 determined to relevant to the inputted key event. For example, a list of task may include a text messaging task, an image viewing task, an email task, or a calendar task. Moreover, the task predictor module 135 may also determine an associated file that may predicted by the task predictor module 135. For example, for the image viewing task, the task predictor module 135 may associate a JPEG file stored in memory 125.

In step 420, the controller 105 may display the list of tasks and associated files on the display 130. At this point, the user may continue entering key events into the default application or select a listed task. In step 425, the controller 105 may determine whether the key event from the user interface 120 is a character or a selected task. If the next key event is a character, the controller 105 returns to the processing of step 410. Subsequently, as the next key event is processed in the entered key event sequence, the list of tasks may or may not change. The additional key event may remove a task and be replaced by a different task application. Similarly, the associated may be modified accordingly. The additional key event may not modify the task list but may change the associated file depending on the output of the task predictor module 135.

Returning to step 425, if the controller 105 determines that the next key event is a selected task, the controller 105 may invoke the application associated with selected task and transfer the entered key event sequence into the open application, in step 430. For example, if the entered key event sequence is the first few letters of a recipient's name for a selected text messaging program, these letters would be transferred to the invoked text messaging program.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of operating a device, the method comprising:
   receiving at least one character of a sequence into a default application from a user interface of the device;
   determining at least one other application supported by the device based on the at least one character;
   identifying a media file stored on the device and associated with the at least one other application;
   displaying a list of the at least one other application on a display of the device along with the media file and the at least one character;
   receiving a key event into the default application from the user interface of the device;
   determining if the key event is a selection for one of the at least one other application;
   invoking the one of the at least one other application based on a determination that the key event is the selection; and
   transferring the at least one character of the sequence into the one of the at least one other application in response to invoking the one of the at least one other application.

2. The method according to claim 1, further comprising:
   modifying the list for the at least one other application on the display based on a determination that the key event is not the selection.

3. The method according to claim 2, wherein modifying the list for the at least one other application comprises adding another application.

4. The method according to claim 2, wherein modifying the list for the at least one other application comprises removing a displayed application from the list.

5. The method according to claim 1, further comprising:
   receiving additional characters for the sequence; and
   invoking the default application of the device in response to the sequence being a telephone number.

6. A computer readable storage medium on which is embedded one or more computer programs, said one or more computer programs implementing a method of operating a device, said one or more computer programs comprising a set of instructions for
   receiving at least one character of a sequence into a default application from a user interface of the device;
   determining at least one other application supported by the device based on the at least one character,
   identifying a media file stored on the device and associated with the at least one other application;
   displaying a list of the at least one other application on a display of the device along with the media file and the at least one character;
   receiving a key event into the default application from the user interface of the device;
   determining if the key event is a selection for one of the at least one other application;
   invoking the one of the at least one other application based on a determination that the key event is the selection; and
   transferring the at least one character of the sequence into the one of the at least one other application in response to invoking the one of the at least one other application.

7. The computer readable storage medium according to claim 6, said set of instructions further comprises:
   modifying the list for the at least one other application on the display based on a determination that the key event is not the selection.

8. The computer readable storage medium according to claim 7, wherein modifying the list for the at least one other application comprises adding another application.

9. The computer readable storage medium according to claim 7, wherein modifying the list for the at least one other application comprises removing a displayed application from the list.

10. The computer readable storage medium according to claim 6, said set of instructions further comprises:
    receiving additional characters for the sequence; and
    invoking the default application of the device in response to the sequence being a telephone number.

11. A system for operating an electronic device, the system comprising:
    a user interface configured to receive input for the electronic device;
    a task predictor module configured to interface with the user interface; and
    a memory configured to store files and applications, the memory configured to interface with the task predictor module, wherein the task predictor module is configured to monitor the user interface for an input of at least one character into a default application, determine at least one additional application that is relevant to the at least one inputted character based on previous accesses to the memory, identify a stored media file associated with the at least one additional application, display a list of the at least one additional application along with the stored media file, receive a key event into the default application from the user interface of the electronic device, determine if the key event is a selection for one of the at least one additional application, invoke the one of the at least one additional application based on a determination that the key event is the selection, and transfer the at least one inputted character into the one of the at least one additional application in response to invoking the one of the at least one additional application.

12. The system according to claim 11, wherein the task predictor module is further configured to modify the list of the at least one additional application based on a determination that the key event is not the selection.

13. The system according to claim 12, wherein the task predictor module is further configured to remove an application from the list of the at least one additional application.

14. The system according to claim 12, wherein the task predictor module is further configured to add another additional application to the list of the at least one additional application.

15. The system according to claim 11, wherein the at least one additional application is one of a media viewer, a text messaging application, an audio file player, a video file player, an internet browser and a computer game application.

16. The system according to claim 11, wherein the default application is a dialing application.

17. The system according to claim 11, wherein the stored media file is one of an image file, an audio file, a video file, a universal resource locator, and a text messaging file.

18. The system according to claim 11, wherein the user interface is one of a keyboard, voice recognition, and gesture recognition.

* * * * *